United States Patent [19]
Genise

[11] Patent Number: 5,191,804
[45] Date of Patent: Mar. 9, 1993

[54] DUAL FORCE FLUID ACTUATED SHIFT DEVICE

[75] Inventor: Thomas A. Genise, Dearborn, Mich.
[73] Assignee: Eaton Corporation, Cleveland, Ohio
[21] Appl. No.: 919,349
[22] Filed: Jul. 23, 1992
[51] Int. Cl.[5] ............................................. B60K 20/10
[52] U.S. Cl. ...................................................... 74/335
[58] Field of Search .......................................... 74/335
[56] References Cited

U.S. PATENT DOCUMENTS

| | | | |
|---|---|---|---|
| 4,445,393 | 5/1984 | Braun | 74/346 |
| 4,796,485 | 1/1989 | Ebina | 74/335 X |
| 4,899,607 | 2/1990 | Stainton | 74/335 |
| 4,928,544 | 5/1990 | Markyvech et al. | 74/335 |

*Primary Examiner*—Dirk Wright
*Attorney, Agent, or Firm*—L. J. Kasper

[57] ABSTRACT

A fluid operated shift actuator (11) is provided, and is especially suited for use in an X-Y shift mechanism for a change-gear mechanical transmission. The shift actuator includes a piston rod (47), a piston member (87), and a pair of auxiliary pistons (93 and 95), to define fluid pressure chambers (91 and 92). After the piston member (87) and the piston rod (47) have been displaced from neutral in either direction, into a gear engagement position, pressurizing both fluid pressure chambers (91 and 92) will cause the actuator to return to the neutral position (gear disengagement) with substantially less force than that exerted when the actuator moved into the gear engagement position.

9 Claims, 4 Drawing Sheets

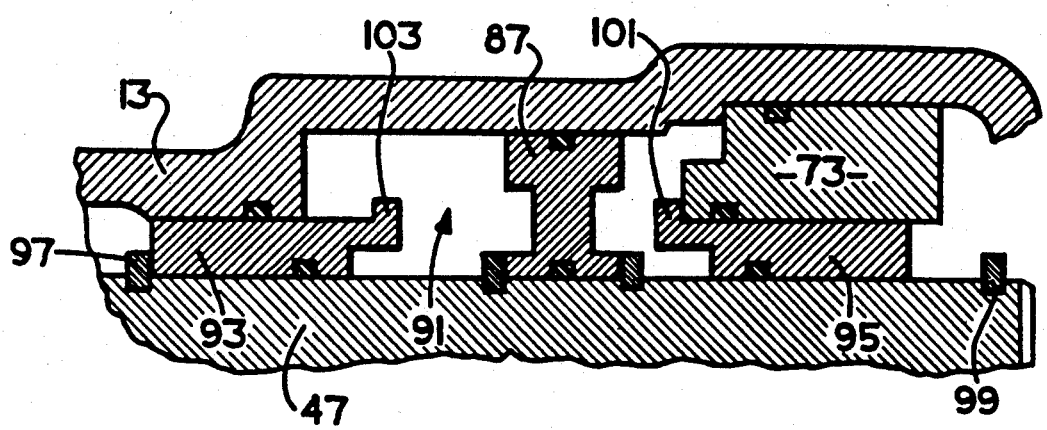
FIG. 4
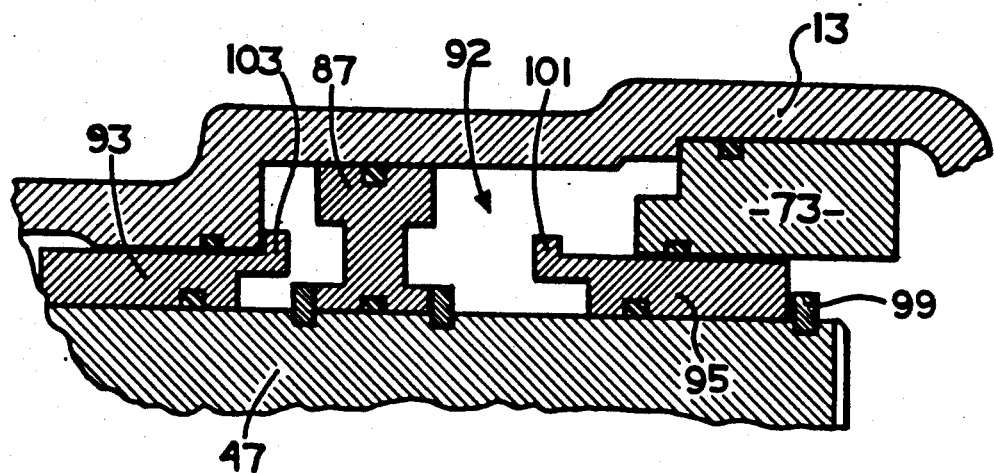
FIG. 6
| S.V. 33 | S.V. 35 | ROD 47 MOVES | FORCE |
|---------|---------|--------------|-------|
| ON | ON | TO NEUTRAL | 58 # |
| ON | OFF | 1ST DIRECTION | 133 # |
| OFF | ON | 2ND DIRECTION | 133 # |
| OFF | OFF | STAYS | 0 # |
FIG. 5

DUAL FORCE FLUID ACTUATED SHIFT DEVICE

BACKGROUND OF THE DISCLOSURE

The present invention relates to a pressurized fluid operated shifting mechanism for cooperation with a shift bar housing assembly for selectively shifting a change-gear mechanical transmission. More particularly, the present invention relates to such a fluid operated shifting mechanism of the "X—Y" type, and will be described in connection therewith.

Shift bar housing assemblies for change-gear mechanical transmissions typically comprise a plurality of generally parallel, independently axially movable shift bars or shift rails, each carrying a shift fork fixed thereto. Each shift bar or shift rail may be selected and moved axially to effect engagement/disengagement of a particular gear ratio. Such assemblies are well known in the prior art and may be better understood by reference to U.S. Pat. Nos. 4,455,883; 4,575,029; and 4,584,895, all of which are incorporated herein by reference.

Such shift bar housings may be manually controlled by the vehicle operator, by means of a shift lever. More recently, it is becoming increasingly popular to utilize automatically controlled pressurized fluid actuating shift actuators with such shift bar housings. In a pressurized fluid operated shift actuator, a shift finger is automatically moved in the X—X (rail selection) direction, in response to actuation of one fluid pressure device, then the shift finger is automatically moved in the Y—Y (gear engagement/disengagement) direction in response to actuation of another fluid operated device.

Shift bar housing assemblies utilizing pressure operated shift actuators to control each shift rail in an automatic or semi-automatic mechanical transmission are known in the prior art, as may be better understood by reference to U.S. Pat. Nos. 4,445,393 and 4,722,237, both of which are incorporated herein by reference.

The prior art fluid operated shift actuators for providing automatic and/or semiautomatic shifting of change-gear mechanical transmissions were not totally satisfactory. In such actuators, pressurized fluid was supplied at only a single fixed (regulated) fluid pressure (typically a relatively high pressure) which resulted in the same amount of force being applied to each shift rail, under all operating conditions. In other words, in the prior art actuators, there is a relatively high force applied to the shift rail to accomplish gear engagement (as is required), but the same relatively high force is also applied to the shift rail to accomplish gear disengagement. Such high force is not required for gear disengagement, and may be detrimental to the operation of the transmission. In many such transmissions, neutral (gear disengagement) is preselected, but the shift to neutral does not actually occur until the vehicle operator takes his foot off the accelerator, and the torque goes through zero, at which point the shift to neutral will occur. If the force being exerted to shift into neutral is too great, the shift into the gear disengagement position may occur before the torque passes through zero. In addition, there is the possibility of overshooting a selected position, as well as the possibility of undue wear to components such as shift forks and the like.

In response to the shortcomings of the prior art described above, there has been developed a dual pressure source type of fluid operated shift actuator, whereby a greater force is exerted on the shift rail moving into gear engagement and is exerted in moving to gear disengagement. See U.S. Pat. No. 4,928,544, assigned to the assignee of the present invention and incorporated herein by reference. Although the actuator assembly of the reference patent successfully overcomes the problems discussed above, the requirement for a dual pressure source and the additional solenoid valves required adds substantially to the overall cost and complexity of the shift actuator assembly.

SUMMARY OF THE INVENTION

Accordingly, it is an object of the present invention to provide an improved fluid operated shift-actuator for a mechanical transmission which is capable of exerting a greater force moving into gear engagement than in moving from gear engagement toward neutral, while utilizing only a single source of pressurized fluid, at a generally fixed regulated pressure.

The above and other objects of the present invention are accomplished by the provision of a fluid operated shift actuator for a mechanical transmission having a neutral condition and a plurality of selectable ratios, the actuator being of the type comprising an actuator housing defining a piston bore within which is reciprocally disposed a main piston member having a centered position corresponding to the neutral condition and a piston rod fixed relative to the piston member to reciprocate therewith. The piston member and the actuator housing cooperate with the piston rod to define a first fluid pressure chamber in open fluid communication with a source of fluid pressure by means of a first fluid control means. The main piston member has an effective area under the influence of the first fluid pressure chamber to bias the main piston member and piston rod in a first direction corresponding to one of the plurality of selectable ratios.

The shift actuator is characterized by the main piston member and the actuator housing cooperating with the piston rod to define a second fluid pressure chamber in open fluid communication with the source of fluid pressure by means of a second fluid control means. The piston member has an effective area under the influence of the second fluid pressure chamber to bias the piston and piston rod in a second direction corresponding to another of the plurality of selectable ratios. A first auxiliary piston is operably associated with the piston rod whereby movement of the piston rod in the first direction moves the first auxiliary piston in the first direction, the first auxiliary piston having an effective area under the influence of the first fluid pressure chamber to bias the first auxiliary piston and the piston rod in the second direction, opposite the first direction, after the main piston member has been displaced from the centered position in the first direction. A second auxiliary piston is operably associated with the piston rod whereby movement of the piston rod in the second direction moves the second auxiliary piston in the second direction, the second auxiliary piston having an effective area under the influence of the second fluid pressure chamber to bias the second auxiliary piston and piston rod in the first direction, after the main piston member has been displaced from the centered position in the second direction.

BRIEF DESCRIPTION OF THE DRAWINGS

FIG. 4 is an enlarged, fragmentary, axial cross-section, similar to FIG. 3, illustrating the shift actuator of the present invention in one of its gear engaged positions.

FIG. 5 is a truth table illustrating the operation of the present invention.

FIG. 6 is an enlarged, fragmentary, axial cross-section, similar to FIG. 4, illustrating a shift actuator of the present invention in the other of its gear-engaged position.

DESCRIPTION OF THE PREFERRED EMBODIMENT

Figure 1:
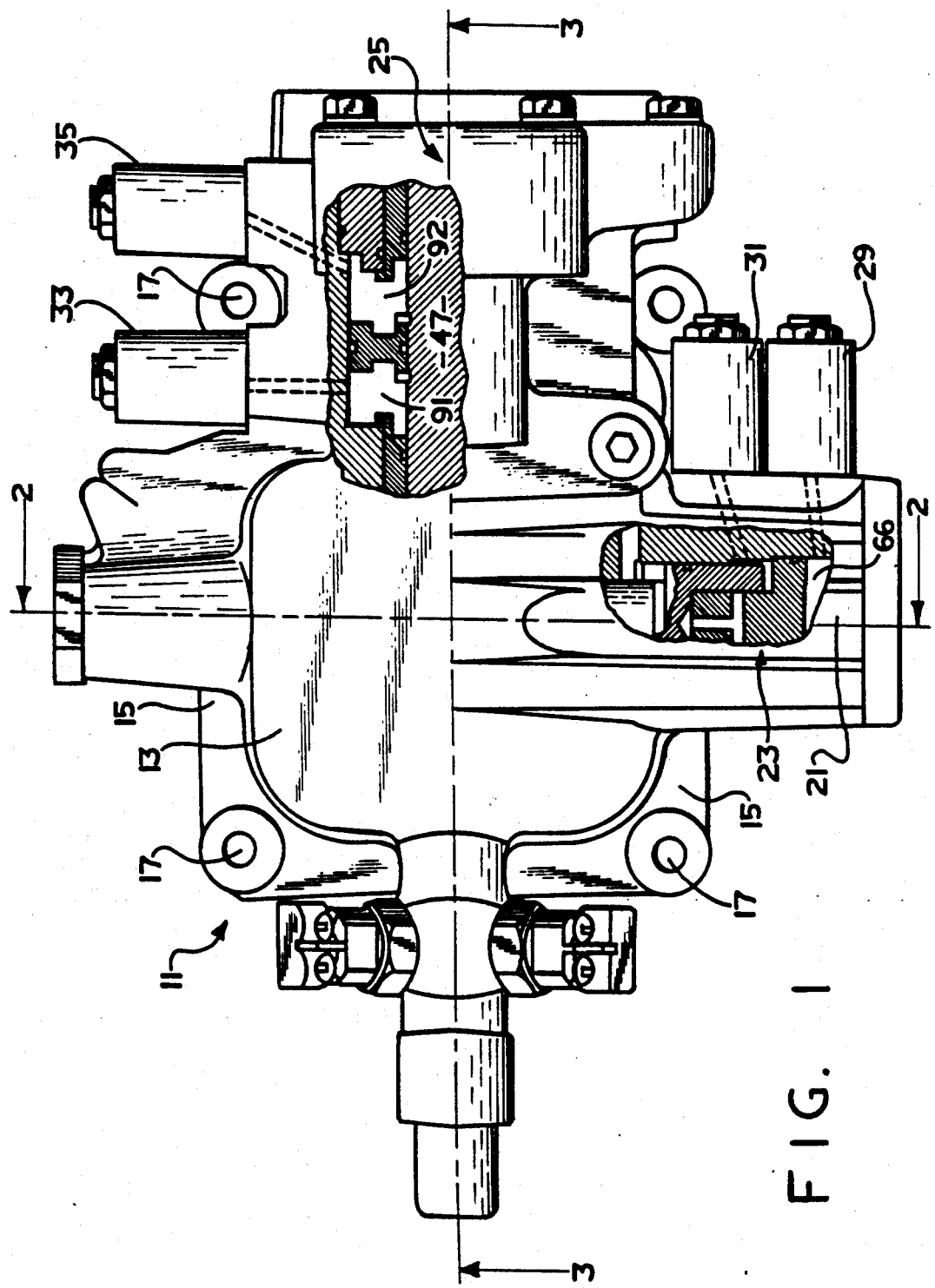
FIG. 1 is a top plan view, partly broken away in two places, of an X—Y shifting mechanism of the type with which the present invention may be utilized.

Referring now to the drawings, which are not intended to limit the invention, FIG. 1 illustrates a top plan view of a fluid operated shift actuator, generally designated 11, of the type with which the present invention may be utilized. The shift actuator would typically be used with a change-gear heavy duty truck mechanical transmission, of the general type now well known in the art, and illustrated in U.S. Pat. No. 3,105,395, incorporated herein by reference.

Figure 7:
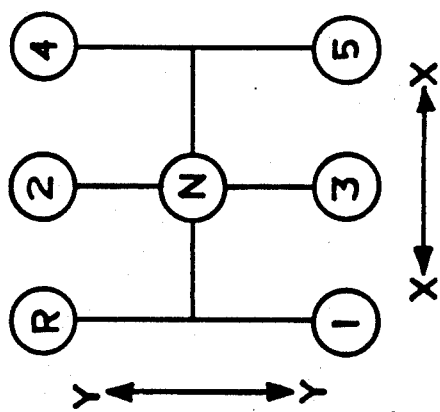
FIG. 7 is a schematic illustration of a typical "H" type shift pattern of the type usable with the shift actuator of the present invention.

Such transmissions typically include a shift bar housing assembly of the type shown in above-incorporated U.S. Pat. No. 4,928,544. Such shift-bar housing assemblies (not shown herein) typically comprise a plurality of axially (from left to right, or right to left in FIG. 1, or up and down in the shift pattern of FIG. 7) movable shift rails, each of which carries a shift fork fixed thereto for axial movement therewith, as is well known to those skilled in the art. Shifting of such transmissions is accomplished by selecting a shift rail, by moving an engagement member such as a shift finger along the axis X—X (up and down in FIG. 1, or from left to right, or right to left in FIG. 7) into alignment with a shift block carried by the selected shift rail. The actual shifting is then accomplished by causing axial movement of the selected shift rail, by axially moving the shift finger to apply an axial force in the direction of the axis Y—Y. Therefore, the fluid operated shift actuator illustrated herein is typically referred to as an X—Y type of shift actuator, because it is capable of moving a shift finger in both the X—X direction and the Y—Y direction. It should be clearly understood, however, that the present invention is not specifically limited to use in an X—Y type shift actuator, but instead, may be used in any type of fluid operated shift actuator in which it is required to be able to move the shift finger from a neutral position to a gear engagement position, and then to return the shift finger from the gear engagement position to the neutral position.

The X—Y shift actuator 11 is enclosed within a housing 13 having a mounting plate portion 15 defining bolt bores 17 in a pattern allowing the actuator 11 to be mounted to the upper opening of a transmission shift bar housing assembly. As may best be seen in FIG. 2, a shift finger 19 extends downwardly from the housing 13 for interaction with the shift rails (not shown herein).

Figure 2:
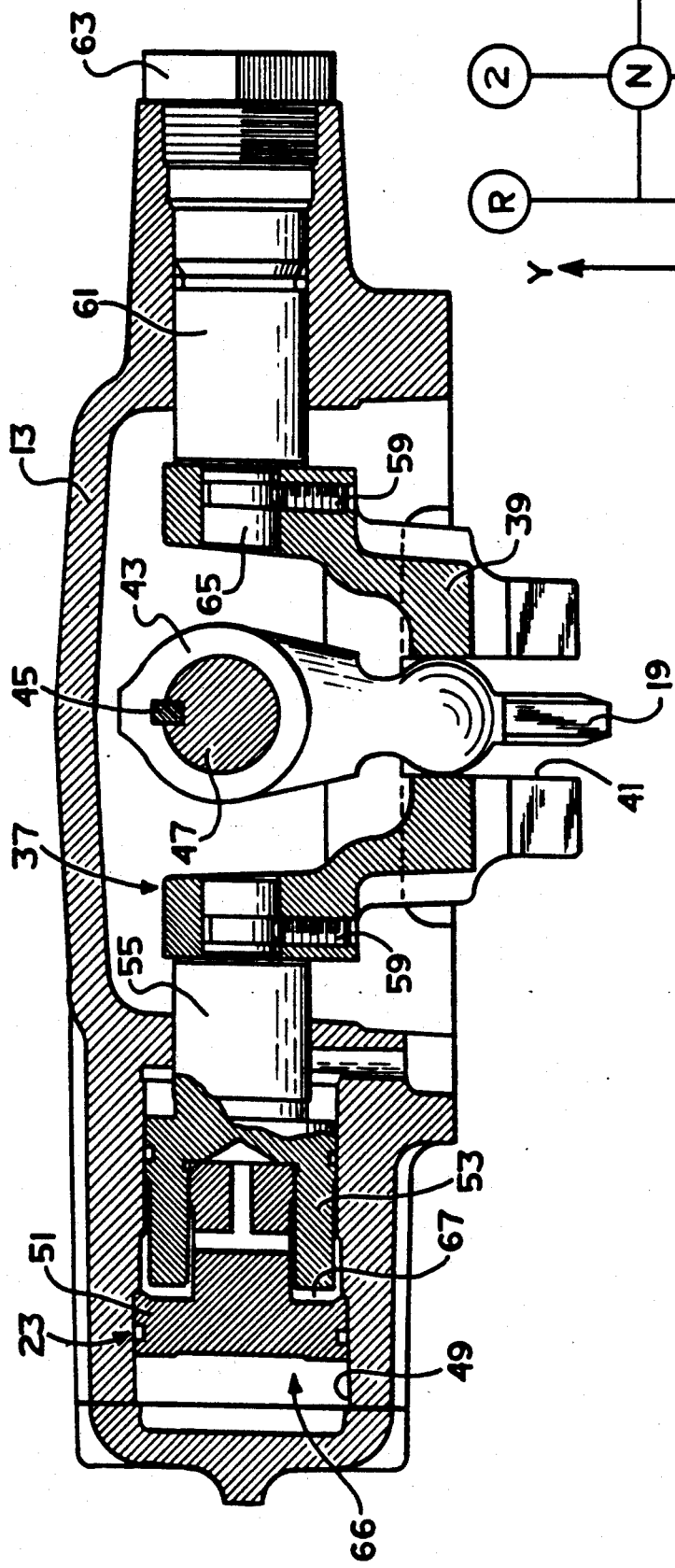
FIG. 2 is a transverse cross-section taken on line 2—2 of FIG. 1, but on a somewhat larger scale, illustrating a conventional X—X shift actuator.

The housing 13 includes a housing portion 21, which encloses a piston-cylinder assembly, generally designated 23 for moving the shift finger 19 transversely in the X—X direction (see FIG. 2). The housing 13 also includes a housing portion 25 which encloses a piston-cylinder assembly, generally designated 27, for moving the shift finger 19 axially in the Y—Y direction (see FIG. 3).

Associated with the housing portion 21 and the piston-cylinder assembly 23 is a pair of 3-way, 2-position solenoid valves 29 and 31. Similarly, associated with the housing portion 25 and the piston-cylinder assembly 27 is a pair of 3-way, 2-position solenoid valves 33 and 35. The solenoid valves 29, 31, 33, and 35 may be of a standard type having a first port connected to a common manifold of pressurized fluid, a second port connected to a common exhaust manifold, and a third port connected to its respective individual pressure chamber, to be controlled by the particular solenoid valve. The valves are normally in the chamber-exhaust position and, by actuation of the solenoids, are movable to the chamber-pressurization position.

Referring now primarily to FIG. 2, the X—X shift actuator will be described briefly, because it is generally well known in the art, and is not an essential feature of the invention. The X—X shift actuator, comprising primarily the piston-cylinder assembly 23, includes a crank arrangement, generally designated 37. The crank arrangement 37 includes a generally U-shaped crank member 39 which defines an opening 41, through which the shift finger 19 extends downwardly, for engagement with the appropriate one of the shift rails. The shift finger 19 comprises a lower extremity of a shift finger carrier 43, which is in fixed, non-rotatable engagement, by means of a key 45, with a piston rod 47 (see also FIG. 3).

Pivotal movement of the shift finger carrier 43 about the axis of the piston rod 47 is accomplished by reciprocating movement of the crank arrangement 37 (i.e., movement from left to right, or from right to left in FIG. 2). Such movement of the crank arrangement 37 is accomplished by pressurization of the piston cylinder assembly 23. The housing 13 defines a stepped cylinder bore 49 within which is disposed a piston member 51. Disposed adjacent the piston member 51 is another piston member 53, which includes a shaft portion 55, received in a bore defined by the housing 13, and a smaller diameter terminal portion 57, received in a bore defined by the U-shaped crank member 39, and axially restrained relative to the crank member 39 by a set screw 59. On the right side of the X—X shift actuator, there is a shaft portion 61, slidably received within a bore defined by the housing 13, the bore being closed by means of a threaded plug member 63. The shaft portion 61 includes a smaller diameter terminal portion 65 which is received in a bore defined by the U-shaped crank member 39, in the same manner as described previously, and is restrained axially relative thereto by means of another set screw 59.

The piston member 51 cooperates with the cylinder bore 49 to define a pressure chamber 65, the fluid pressure in the chamber 65 being controlled by the solenoid valve 29 (see FIG. 1). The piston members 51 and 53 cooperate with cylinder bore 49 to define a fluid pressure chamber 67, the fluid pressure in the chamber 67 being controlled by the solenoid valve 31 (see FIG. 1).

Figure 3:
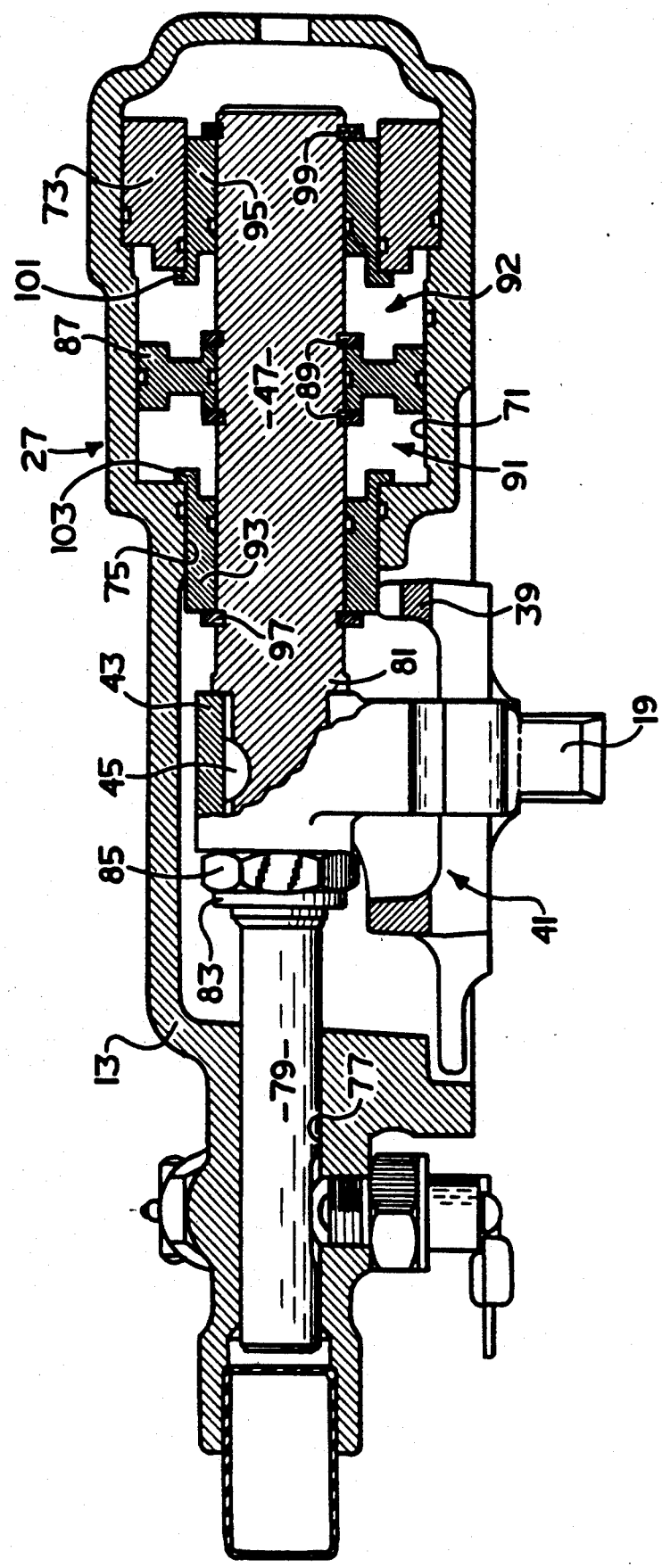
FIG. 3 is an axial cross-section, taken on line 3—3 of FIG. 1, and on a somewhat larger scale than FIG. 1, illustrating a Y—Y shift actuator made in accordance with the present invention, disposed in its neutral position.

Referring now primarily to FIG. 3, the Y—Y shift actuator of the present invention will be described in detail. The Y—Y shift actuator primarily comprises the piston-cylinder assembly 27. The housing 13 defines a stepped cylinder bore 71, within which is fixedly disposed an annular support member 73. The support member 73 defines a particular inside diameter which, preferably, is the same as an inside diameter 75 defined by the housing 13. The housing 13 further defines a relatively smaller diameter bore portion 77, within which is slidably received a smaller diameter portion 79 of the piston rod 47. The piston rod 47 defines a shoulder 81 and a threaded portion 83, and the shift finger carrier 43 is restrained axially against the shoulder 81 by means of a nut 85, in threaded engagement with the threaded portion 83.

The piston cylinder assembly 27 comprises a main piston member 87, which is fixed, axially, relative to the piston rod 47 by means of a pair of snap rings 89. The main piston member 87 cooperates with the piston rod 47 and the housing 13 to define a first pressure chamber 91 and a second pressure chamber 92, the fluid pressure in the chambers 91 and 92 being controlled by the solenoid valves 33 and 35, respectively, as will be described in greater detail subsequently.

Disposed radially between the piston rod 47 and the diameter 75 of the housing 13 is a first auxiliary piston 93, and disposed radially between the piston rod 47 and the inside diameter of the support member 73 is a second auxiliary piston 95.

The Y—Y shift actuator of the present invention is shown in FIG. 3 in its "centered" position, corresponding to a "neutral" position of the particular rail being controlled, with the particular gear being controlled being out of gear engagement. The neutral position of the particular rail may be maintained by actuating both solenoid valves 33 and 35, the reason for which will be described in greater detail subsequently. For purposes of subsequent explanation of the invention, movement of the piston rod 47 the right in FIG. 3 will be referred to as movement in a "first direction", whereas movement of the piston rod to the left in FIG. 3 will be referred to as movement in a "second direction". Therefore, actuation of the solenoid 33 to pressurize the first pressure chamber 91, with the solenoid valve 35 in its exhaust position, will exert a pressure on the main piston 87, moving the piston rod 47 in the first direction. On the other hand, actuation of the solenoid valve 35 to pressurize the second pressure chamber 92 with the solenoid valve 33 in its exhaust position, will exert a pressure on the main piston 87 to move the piston rod 47 in the second direction. As is well known to those skilled in the art, in the typical application of a Y—Y shift actuator, movement of the piston rod 47 in either the first or second directions, from the centered (neutral) position results in movement of the particular gear being controlled into a gear engagement position. Further, as was discussed in the background of the present specification, it is typically desirable to exert a particular, predetermined amount of force in order to accomplish gear engagement.

In accordance with one important aspect of the present invention, there is a snap ring 97 disposed adjacent the left end of the first auxiliary piston 93, whereby movement of the piston rod 47 in the first direction causes movement of the first auxiliary piston 93 in the first direction. Similarly, there is a snap ring 99 disposed adjacent the right end of the second auxiliary piston 95, such that movement of the piston rod 47 in the second direction causes movement of the second auxiliary piston 95 in the second direction. However, movement of the first auxiliary piston 93 to the left in FIG. 3 is limited by a stop portion 103, and movement of the second auxiliary piston 95 to the right in FIG. 3 is limited by a stop portion 101 which engages the support member 73. In accordance with another important aspect of the present invention, exerting a force on the first auxiliary piston 93 to the left in FIG. 3, will move it and the piston rod 47 in the second direction. Similarly, exerting a force on the second auxiliary piston 95 to the right in FIG. 3, will move it and the piston rod 47 in the first direction.

Referring now to FIG. 5, in conjunction with FIG. 3, the operation of the Y—Y shift actuator of the present invention will be described. It should first be noted that the main piston member 87 has an area A1 exposed to the fluid pressure in the first pressure chamber 91, and the same area A1 exposed to the fluid pressure in the second pressure chamber 92. The first auxiliary piston 93 has an area A2 exposed to the pressure in the first chamber 91, while the second auxiliary piston 95 has the same area A2 exposed to the pressure in the second chamber 92. Although not an essential feature of the present invention, it is preferred that the area on each side of the main piston member 87 be the same, and it is preferred that each of the auxiliary pistons 93 and 95 have the same area, for reasons which will become apparent subsequently.

With the shift actuator 27 in the neutral position shown in FIG. 3, if the solenoid valve 33 is actuated ("ON"), while the solenoid valve 35 is deactuated ("OFF"), the resulting axial force (in lbs.) tending to move the piston rod 47 in the first direction will be the product of the pressure (in psi) in the first pressure chamber 91, and the differential area (i.e., area A1-area A2). On a typical heavy-duty truck, the on-board air supply is usually filtered and regulated to about sixty to eighty psi by some form of a well known filter/regulator device, not shown or described herein. In one particular embodiment of the present invention under development, utilizing a pressure of 60 psi resulted in an axial force, in the first direction, into gear engagement, of 133 lbs (see FIG. 5). As may also be seen in FIG. 5, with the shift actuator in the neutral position of FIG. 3, actuation of the solenoid 35 (and deactuation of the solenoid 33) to generate a pressure of 60 psi in the second pressure chamber 92 would result in the same force of 133 lbs. on the piston rod 47, but now in the second direction, into a different gear engagement position.

Referring now to FIG. 4, in conjunction with FIGS. 3 and 5, the shift actuator is shown in FIG. 4 in its first, gear engagement position, subsequent to the shift operation described previously wherein the solenoid valve 33 was actuated. It is worth noting that, with the shift actuator in the first position shown in FIG. 4, both solenoid valves 33 and 35 may be deactuated ("OFF") and the piston rod 47 will stay in the gear engaged position. As a result of this aspect of the present invention, the shift actuator 27 may advantageously be used also as an X—X shift actuator because, in the event of the loss of electrical power or the loss of fluid pressure, the shift actuator will remain in the selected position. If it is now desired by the vehicle operator to move the shift rail from the gear engaged position represented in FIG. 4 back to the neutral position represented in FIG. 3, both of the solenoid valves 33 and 35 are actuated ("ON"). With the same fluid pressure present in each of the chambers 91 and 92, there are equal and opposite forces on the areas A1 on opposite sides of the main piston member 87. Thus, those forces oppose each other and cancel.

With the shift actuator in the first position shown in FIG. 4, and with the second auxiliary piston 95 axially displaced from the snap ring 99, the pressure in the second chamber 92 exerts no force on the piston rod 47 in the first direction. Therefore, the net force acting on the piston rod 47 is the pressure in the first pressure chamber 91 acting on the net area A2 defined by the first auxiliary piston 93. In the subject embodiment, the area A2 is only about 43% of the difference between the area A1 and the area A2. With both solenoid valves 33 and 35 actuated, the piston rod 47 is returned to the neutral position with a force (about 58 lbs. in the subject embodiment) which is only about 43% of the force applied as the shift rail moves into gear engagement.

Referring now primarily to FIG. 6, there is illustrated the shift actuator in the second position in which the first auxiliary piston 93 is axially displaced from its snap ring 97 (not shown in FIG. 6). The pressure in the first pressure chamber 91 therefore exerts no force on the piston rod 47 in the second direction. The net force acting on the piston rod 47 is the pressure in the second pressure chamber 92 acting on the net area A2 defined by the second auxiliary piston 95. In the subject embodiment, with the area A2 being only about 43% of the difference between the area A1 and the area A2, actuation of both the solenoid valves 33 and 35 results in the piston rod 47 being returned to the neutral position with the same force as described in the preceding paragraph, i.e., about 58 pounds.

Thus, it may be seen that the present invention provides an improved fluid operated shift actuator which is capable, utilizing only a single constant pressure source, of applying a relatively greater force to a shift rail as it moves from neutral into gear engagement, and then applying a relatively smaller force to the shift rail as it moves from gear engagement back into neutral.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A fluid operated shift actuator for a mechanical transmission having a neutral condition and a plurality of selectable ratios, said actuator being of the type comprising an actuator housing defining a piston bore within which is reciprocally disposed a main piston member having a centered position corresponding to said neutral condition, and a piston rod fixed relative to said piston member to reciprocate therewith, said piston member and said actuator housing cooperating with said piston rod to define a first fluid pressure chamber in fluid communication with a source of fluid pressure by means of a first fluid control means; said main piston member having an effective area under the influence of said first fluid pressure chamber to bias said main piston member and piston rod in a first direction corresponding to one of said plurality of selectable ratios; characterized by:

(a) said main piston member and said actuator housing cooperating with said piston rod to define a second fluid pressure chamber in fluid communication with said source of fluid pressure by means of a second fluid control means; said piston member having an effective area under the influence of said second fluid pressure chamber to bias said piston and piston rod in a second direction corresponding to another of said plurality of selectable ratios;

(b) a first auxiliary piston operably associated with said piston rod whereby movement of said piston rod in said first direction moves said first auxiliary piston in said first direction, said first auxiliary piston having an effective area under the influence of said first fluid pressure chamber to bias said first auxiliary piston and piston rod in said second direction, opposite said first direction, after said main piston member has been displaced from said centered position in said first direction; and (c) a second auxiliary piston operably associated with said piston rod whereby movement of said piston rod in said second direction moves said second auxiliary piston in said second direction, said second auxiliary piston having an effective area under the influence of said second fluid pressure chamber to bias said second auxiliary piston and piston rod in said first direction, after said main piston member has been displaced from said centered position in said second direction.

2. A fluid operated shift ator as claimed in claim 1, characterized by said main piston member having an effective area under the influence of said first fluid pressure chamber, and having said effective area under the influence of said second fluid chamber.

3. A fluid operated shift actuator as claimed in claim 2, characterized by said first auxiliary piston having an effective area under the influence of said first fluid pressure chamber, said area being substantially greater than said area.

4. A fluid operated shift actuator as claimed in claim 2, characterized by said second auxiliary piston having said effective area under the influence of said second fluid pressure chamber, said area being substantially greater than said effective area of said second auxiliary piston.

5. A fluid operated shift actuator as claimed in claim 4, characterized by said second auxiliary piston having said effective area under the influence of said second fluid pressure chamber.

6. A fluid operated shift actuator as claimed in claim 1, characterized by said first auxiliary piston being operably associated with said piston rod by means of a member disposed in fixed engagement with said piston rod and disposed axially, in said second direction, from said first auxiliary piston, when said piston rod has been displaced in said second direction.

7. A fluid operated shift actuator as claimed in claim 6, characterized by said member comprising a snap ring member disposed in a groove defined by said piston rod.

8. A fluid operated shift actuator as claimed in claim 1, characterized by said second auxiliary piston being operably associated with said piston rod by means of a member disposed in fixed engagement with said piston rod and disposed axially, in said first direction, from said second auxiliary piston, when said second auxiliary piston, when said piston rod has been displaced by said first direction.

9. A fluid operated shift actuator as claimed in claim 8, characterized by said member comprising a snap ring member disposed in a groove defined by said piston rod.

* * * * *